Figure 1:
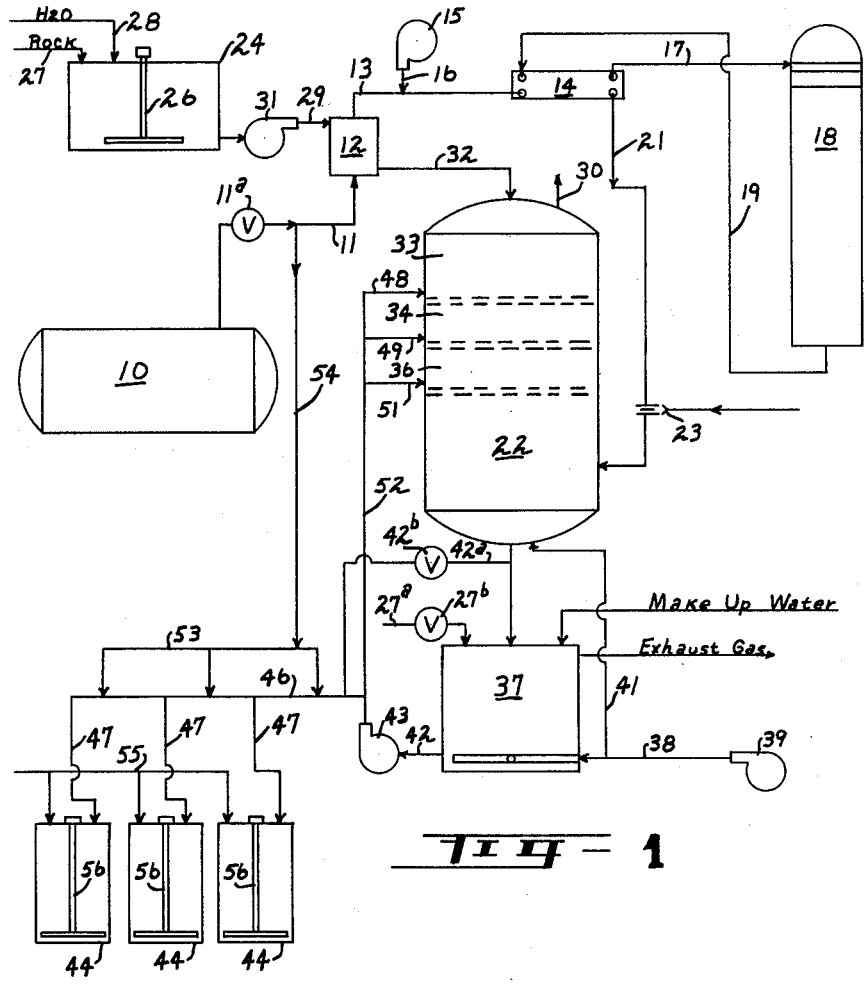

INVENTOR.
Herbert L. Thompson
James C. Lacey Jr.
BY
Jennings, Carter + Thompson
Attorneys

United States Patent Office 3,155,489
Patented Nov. 3, 1964

3,155,489
PROCESS FOR PRODUCING A FERTILIZER SUSPENSION PRODUCT HAVING NITROGEN FERTILIZER VALUES
Herbert L. Thompson, 329 Brown-Marx Bldg., Birmingham 3, Ala., and James C. Lacey, Jr., % Southern Research Institute, 2000 9th Ave. S., Birmingham, Ala.
Filed July 27, 1960, Ser. No. 45,727
8 Claims. (Cl. 71—37)

This invention relates to a fertilizer suspension of solid particles in liquid media and the process for producing the same and more particularly to such a process which employs nitrogen oxides to acidulate a slurry of a calcium compound selected from the group consisting of phosphate rock, limestone, dolomite and mixtures thereof, whereby nitrogen values are obtained without the necessity of producing nitric acid itself.

Another object of our invention is to provide means for producing a fertilizer suspension, of the character designated, in which the nitrogen oxides are obtained economically through the oxidation of ammonia.

Another object of our invention is to provide a product of the character designated which eliminates the necessity of converting hygroscopic calcium nitrate to nonhygroscopic form and also eliminates the costly steps of drying and granulating fertilizer materials.

A more specific object of our invention is to provide a process for producing a fertilizer suspension of solid particles in liquid media by the combined steps of oxidation, absorption and acidulation.

Another object of our invention is to provide process for producing a fertilizer suspension of solid particles in liquid media in which the combined equipment and operating cost would not exceed the cost for the production of an equivalent amount of nitric acid.

Another object of our invention is to provide a fertilizer suspension of solid particles in liquid media which shall comprise a balanced fertilizer containing nitrogen, phosphate, and potash, together with other additives and which shall be easily handled and applied by the user.

Another object of our invention is to provide a process of the character designated which permits the use of low-grade phosphate rock and the use of a very low-cost nitrogen source.

A further object of our invention is to provide a process of the character designated in which the product may be neutralized with or without ammonia and without the reversion of phosphate values by employing magnesium ions where the product is acid and is neutralized by the addition of ammonia.

A still further object of our invention is to provide a process of the character designated which is simple and economical to operate and one which is particularly adapted for small plant operation whereby the fertilizer suspension is produced near the point of use.

Heretofore in the art to which our invention relates, various processes have been devised for acidulating phosphate rock with nitric acid. Most processes have been unsatisfactory due to the high cost of nitric acid and due to the fact that such processes produce the by-product calcium nitrate. Since calcium nitrate is very hygroscopic, it must be made nonhygroscopic if the solid granular fertilizer is to be non-caking. To overcome these difficulties we employ nitrogen oxides directly and produce a final product in the form of a liquid suspension, thereby eliminating the expensive operations of filtering, evaporation, chemical readjustment, crystallization or granulation, curing, drying, conditioning, and bagging, which operations are required in the production of a solid fertilizer. That is, our cost advantage results to a great extent from the direct absorption of nitrogen oxides by water suspensions of the calcium compounds to form the fertilizer suspension of solid particles in liquid media.

Figure 2:
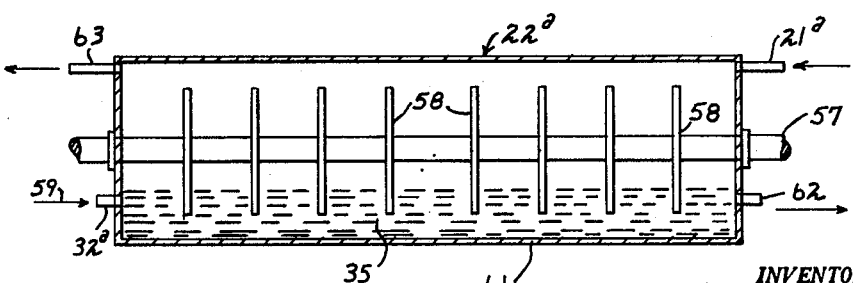

Apparatus embodying features of our invention and which may be employed to carry out our improved process is shown on the accompanying drawing, forming a part of this application, in which:

FIG. 1 is a flow sheet; and,
FIG. 2 is a vertical sectional view showing a modified form of absorber apparatus which may be employed.

Referring to the drawings for a better understanding of our invention, we show the anhydrous ammonia as being supplied from a storage tank 10 through a conduit 11, having a pressure reducing valve 11ª therein, to a vaporizer 12. A conduit 13 communicates the vaporizer 12 with a preheater 14. Air is supplied to the conduit 13 by a blower 15 and conduit 16 whereby the ammonia gas is mixed with air prior to being introduced into one chamber of the preheater 14. The heated mixture of ammonia and air passes from the preheater 14 through a conduit 17 to the inlet of an oxidation unit 18. The discharge side of the oxidation unit 18 communicates with the other chamber of the preheater 14 by a conduit 19. As the ammonia air mixture passes through the preheater 14 and the oxidation unit 18, most of the ammonia is converted to nitric oxide by the following reaction:

$$NH_3 + 5/4 O_2 \rightarrow NO + 3/2 H_2O$$

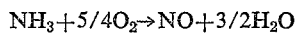

The gas containing nitrogen oxide is removed from the preheater 14 through a conduit 21 and is conveyed to an absorber chamber 22. Communicating with the conduit 21 is a water nozzle 23 for introducing water into the nitrogen oxides prior to introducing the same into the absorber unit 22. The conduit 21 communicates with the lower portion of the absorber chamber 22 at a point above the bottom thereof whereby the fertilizer suspension collects in the bottom of the absorber unit below the point that the nitrogen oxides are introduced into the absorber chamber. By introducing water into the conduit 21, the oxides of nitrogen are cooled prior to introduction into the absorber chamber.

An aqueous slurry of a calcium compound, such as phosphate rock, limestone, dolomite or mixtures of these calcium compounds, is supplied by a mixing tank 24 having a suitable agitator 26 therein. The calcium compound is introduced into the supply tank 24 as at 27 while the water is introduced into the tank 24 by a conduit 28. The aqueous slurry is transferred from the tank 24 through the vaporizer 12 by a suitable conduit 29 having a pump 31 therein. As the aqueous slurry passes through the vaporizer, the latent heat of evaporation of the aqueous ammonia indirectly cools the slurry prior to introduction thereof into the absorber chamber 22 through a conduit 32.

While we have shown the vaporizer 12 as being in communication with the conduits 11 and 13 whereby the aqueous slurry is cooled prior to being introduced into the absorber chamber, the vaporizer may be eliminated where desired, whereby the aqueous slurry is introduced directly from the storage tank 24 into the absorber chamber 22. In this case, the ammonia, with or without prior vaporization, would be mixed with air and then introduced directly into the preheater 14. Residual gases from chamber 22 exit at outlet 30.

The sequence of oxidation, absorption and acidulation reactions taking place within the absorber 22 includes the following reactions:

$$2NO + O_2 \rightarrow 2NO_2$$
$$3NO_2 + H_2O \rightarrow 2HNO_3 + NO$$
$$2NO + O_2 \rightarrow 2NO_2$$

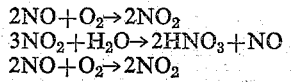

The products from the above reactions then react with the calcium compound, such as phosphate rock in the proportions approximately as follows:

$$Ca_{10}(PO_4)_6F_2 + 21NO_2 + 7H_2O \rightarrow 3CaH_4(PO_4)_2 + 7Ca(NO_3)_2 + 2HF + 7NO$$

The nitrogen oxide released in this reaction is reoxidized as in the sequence above.

In FIG. 1 of the drawing, we shown the absorber chamber as being divided into a plurality of zones indicated at 33, 34 and 36. The suspension formed by mixing the slurry with the oxides of nitrogen is discharged into a suitable cooler 37, which may employ air or water as the cooling medium. Air may be supplied to the cooler 37 by a conduit 38 having an air blower 39 therein. Also, the conduit 38 communicates with a conduit 41 which supplies stripping air to the lower end of the absorber chamber 22 whereby the last treatment of the suspension in the absorber chamber is the stripping action by the air to thus remove dissolved oxides of nitrogen therefrom. The suspension is removed from the cooler 37 by a conduit 42 having a pump 43 therein whereby a portion of the suspension is discharged into suitable mix tanks indicated at 44 by a conduit 46 having branch conduits 47 connected thereto. The remaining portion of the suspension is conveyed to the three zones 33, 34 and 36 by branch conduits 48, 49 and 51, respectively, connected to a conduit 52 which in turn communicates with pump 43, as shown. By maintaining the mixture in the absorber chamber at a relatively low temperature a better recovery of nitrogen oxides is obtained.

Suitable additives such as ammonia, calcium carbonate or trace elements, such as boron, iron, copper, zinc and manganese may be added to the mix tanks 44 by a supply conduit 53. Where the additive is ammonia, the ammonia is added by a conduit 54 which communicates with the storage tank 10. To provide a balanced fertilizer, potassium compounds such as muriate of potash may be added to the mix tanks 44 by a suitable conduit 55. The fertilizer mixtures in the mix tanks 44 are thoroughly agitated by suitable agitators 56 prior to being removed therefrom.

Preferably, approximately ⅙ of the fertilizer suspension in circulation is removed by the conduit 46 while the remaining portion is conveyed through the conduits 52 into the branch conduits 48, 49 and 51 to the zones 33, 34 and 36 of the absorber chamber 22. Preferably, the aqueous slurry introduced into the absorber chamber 22 through the conduit 32 is at a temperature ranging from approximately 50° F. to 80° F. The portion of the suspension which is reintroduced into the absorber chamber 22 through conduit 52 is cooled to a temperature ranging from approximately 80° F. to 200° F. Where the suspension is air cooled, the portion of the suspension which is reintroduced into the absorber chamber 22 is cooled to a temperature ranging from approximately 130° F. to 200° F. On the other hand, where the suspension is water cooled, the portion of the suspension reintroduced is cooled to a temperature ranging from approximately 80° F. to 130° F. The nitric oxide gases which are introduced through the conduit 21 are cooled by the water introduced through the nozzle 23, thereby eliminating the necessity for more expensive methods of cooling the gases.

The ratio of the water to the calcium compound in the aqueous slurry introduced through the conduit 32 into the absorber chamber 22 ranges from approximately .5:1 to 3:1. That is, it is preferable to have at least this much water in the slurry due to the fact that the slurry becomes quite viscous when lower proportions of water are employed. Furthermore, the absorption of oxides is greatly accelerated by employing such dilutions.

On neutralization of nitrophosphate fertilizer with ammonia, the phosphate will revert to insoluble forms unless steps are taken to avoid such reversion. The addition of magnesium or aluminum salts will prevent reversion as the slurry is made alkaline. That is, the addition of a small amount of magnesium sulfate before neutralization with ammonia inhibits the reversion of the phosphate to insoluble form. While the neutralization increases the amount of water-insolubles, these insolubles are mostly citrate-soluble. The fact that these solids are precipitated indicates that they are very fine and are easy to disperse by suitable means. Also, suitable dispersing agents, such as attapulgite clay, may be employed whereby very little settling occurs. Trace elements are easily added to such suspensions due to the fact that they precipitate in a finely divided, easily suspendable form during the neutralization.

In FIG. 2 of the drawings, we show an absorber chamber $22^a$ which comprises a horizontal tank containing a centrally disposed shaft 57. A plurality of discs 58 are mounted on the shaft 57. The slurry, indicated at 35, is introduced through a conduit $32^a$ and is conveyed in the direction of the arrow 59 to outlet 62. The diameter of the discs 58 is less than the internal diameter of the housing 61 for the absorber chamber $22^a$, as shown. Preferably, the diameter of the discs 58 is approximately ¾ the width of the housing 61. The shaft is driven, by suitable means, at a speed whereby droplets of the slurry are thrown outwardly through the gases which are introduced into the housing 61 by a supply conduit $21^a$. Residual gases exit at outlet 63. The gases introduced through the conduit $21^a$ thus flow in a direction countercurrent to the direction of flow of the slurry. Accordingly, the apparatus shown in FIG. 2 has the advantages of providing a true countercurrent flow of gas and liquid, requires no circulating pumps and may be fabricated economically. It will be apparent that the periphery of the discs 58 may be modified in a manner well understood in the art to assist in the pick-up of the slurry.

While we have shown the absorber chamber 22 as being provided with a plurality of zones for recirculating the slurry or suspension, it will be apparent that our improved process may be carried out by employing an absorption tower having a large vapor volume, for a long contact time, in which a water slurry of phosphate rock, or the like, is introduced at the top and the oxides of nitrogen are introduced at the bottom. It will be apparent that suitable cooling means must be provided with such apparatus.

As an alternative to the manner in which our improved process is carried out we may introduce some or all of the calcium compound into the cooler 37 through a supply conduit $27^a$ having a control valve $27^b$ therein. Where the calcium compound is thus added to the cooler 37, a portion of the product from the absorber chamber 22 would by-pass the cooler 37 and flow through a conduit $42^a$, having a regulating valve $42^b$ therein, to conduit 46 and then to mix tanks 44. The remaining portion of the product from the absorber chamber 22 would pass through the cooler and then be recycled through the absorber chamber 22 as described hereinabove. It will be understood that where the calcium compound is added to the cooler 37, the water would still be added to the absorber chamber through conduit 32.

By adding a portion or all of the calcium compound to the cooler 37, the absorber chamber can be operated under a more acid condition to produce more available $P_2O_5$. That is, the calcium compound stabilizes or neutralizes the nitrogen compounds discharged at the bottom of the absorber chamber into the cooler 37, thereby reducing the loss of nitrogen dioxide.

From the foregoing, it will be seen that we have devised an improved fertilizer suspension of solid particles in liquid media. By providing a fertilizer in the form of a suspension, we overcome completely the problem of incorporating additives thoroughly and uniformly throughout the fertilizer, even though the additives may be completely insoluble in the liquid forming the suspension. Our improved fertilizer is especially economical of manufacture due to the fact that all of the nitrogen is in the form of calcium nitrate which is non-acid forming in the soil, thereby preventing the formation of an acid residue. Also, since all the calcium nitrate is in solution or suspension, we eliminate entirely the problem of handling the calcium nitrate in solid form.

Also, by forming calcium nitrate as a part of our fertilizer suspension, our process particularly adapted for use with low-grade, low-cost phosphate rock whereby an excellent fertilizer is provided at a minimum of cost. Also, limestone and dolomite or mixtures of phosphate rock and limestone or of phosphate rock and dolomite may be employed. Furthermore, by providing a process and apparatus which is particularly adapted for operation on a small scale, the fertilizer plants may be distributed in close proximity to the point of use, thereby reducing the cost of shipping and storage and also making the process adapted for movement to the source of supply of the raw materials.

While we have shown our invention in several forms, it will be obvious to those skilled in the art that it is not so limited but is susceptible of various other changes and modifications without departing from the spirit thereof, and we desire, therefore, that only such limitations shall be placed thereupon as are specifically set forth in the appended claims.

What we claim is:

1. The process of producing a usable fertilizer suspension product of solid particles in liquid media which comprises the steps of:
   (a) vaporizing anhydrous ammonia in a heat exchanger,
   (b) passing an aqueous slurry of a pulverized calcium compound selected from the group consisting of phosphate rock, limestone, dolomite and mixtures thereof through said heat exchanger whereby the latent heat of vaporization of said anhydrous ammonia cools said aqueous slurry,
   (c) the ratio of water to the calcium compound in said aqueous slurry ranging from 0.5:1 to 3:1,
   (d) preheating the vaporized ammonia in the presence of oxygen,
   (e) reacting said preheated ammonia and oxygen to produce oxides of nitrogen selected from the group consisting of NO and $NO_2$,
   (f) reacting said oxides of nitrogen within a reaction zone with the cooled aqueous slurry to form a usable fertilizer suspension product having nitrogen fertilizer values, and
   (g) removing said fertilizer suspension product from the reaction zone.

2. The process of producing a usable fertilizer suspension product of solid particles in liquid media which comprises the steps of:
   (a) preheating ammonia in the presence of oxygen,
   (b) reacting said preheated ammonia and oxygen to produce oxides of nitrogen selected from the group consisting of NO and $NO_2$,
   (c) introducing an aqueous slurry of a pulverized calcium compound selected from the group consisting of phosphate rock, limestone, dolomite and mixtures thereof adjacent one end of a reaction zone,
   (d) the ratio of water to the calcium compound in said aqueous slurry ranging from 0.5:1 to 3:1,
   (e) introducing said oxides of nitrogen adjacent but in spaced relation to the other end of said reaction zone thereby acidulating said aqueous slurry to form a suspension of solid particles in liquid media,
   (f) removing said suspension from the other end of the reaction zone and reintroducing continuously a substantial portion of said suspension at selected spaced apart locations along said reaction zone whereby substantially complete acidulation takes place, and
   (g) removing a portion of said suspension from said other end of the reaction zone as a usable fertilizer suspension product having nitrogen fertilizer values.

3. The process of producing a usable fertilizer suspension product of solid particles in liquid media which comprises the steps of:
   (a) preheating ammonia in the presence of oxygen,
   (b) reacting said preheated ammonia and oxygen to produce oxides of nitrogen selected from the group consisting of NO and $NO_2$,
   (c) introducing an aqueous slurry of a pulverized calcium compound selected from the group consisting of phosphate rock, limestone, dolomite and mixtures thereof adjacent one end of a reaction zone whereby said slurry moves in a generally horizontal direction,
   (d) the ratio of water to the calcium compound in said aqueous slurry ranging from 0.5:1 to 3:1,
   (e) introducing said oxides of nitrogen adjacent the other end of said reaction zone whereby said oxides of nitrogen flow in a generally horizontal direction and countercurrent to the flow of said slurry,
   (f) mixing said slurry with said oxides of nitrogen as they pass countercurrent to each other thereby forming a usable fertilizer suspension product of solid particles in liquid media, and
   (g) removing said fertilizer suspension product from said reaction zone.

4. The process of producing a fertilizer suspension of solid particles in liquid media as defined in claim 2 in which the temperature of said aqueous slurry introduced into said one end of the reaction zone ranges from approximately 50° F. to 80° F. and the temperature of said suspension reintroduced into the reaction zone is cooled to a temperature ranging from approximately 80° F. to 200° F.

5. The process of producing a fertilizer suspension of solid particles in liquid media as defined in claim 2 in which the reacting materials flow in a generally vertical direction.

6. The process of producing a fertilizer suspension of solid particles in liquid media as defined in claim 2 in which stripping air is introduced into said other end of the reaction zone.

7. The process of producing a fertilizer suspension of solid particles in liquid media as defined in claim 2 which includes the step of introducing water into intimate contact with said oxides of nitrogen prior to reaction with said aqueous slurry whereby said oxides of nitrogen are cooled.

8. The process of producing a fertilizer suspension of solid particles in liquid media as defined in claim 2 in which at least a portion of said calcium compound is added to said portion of the suspension that is reintroduced.

References Cited in the file of this patent

UNITED STATES PATENTS

| | | |
|---|---|---|
| 1,292,293 | Foss | Jan. 21, 1919 |
| 2,160,177 | Shuman | May 30, 1939 |
| 2,270,518 | Ellis et al. | Jan. 20, 1942 |
| 2,350,982 | Borst | June 13, 1944 |
| 2,707,676 | Picot et al. | May 3, 1955 |
| 2,713,534 | Constant | July 19, 1955 |
| 2,874,036 | Datin | Feb. 17, 1959 |
| 2,942,953 | Shields | June 28, 1960 |

FOREIGN PATENTS

| | | |
|---|---|---|
| 247,230 | Great Britain | Feb. 8, 1926 |
| 602,006 | Great Britain | May 18, 1948 |